J. FINCH.
AUTOMOBILE ATTACHMENT.
APPLICATION FILED APR. 9, 1920.
1,388,940.
Patented Aug. 30, 1921.
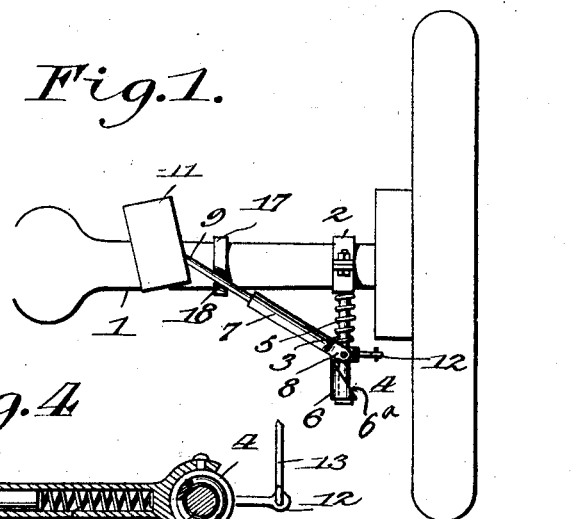
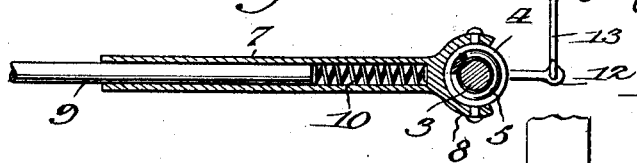
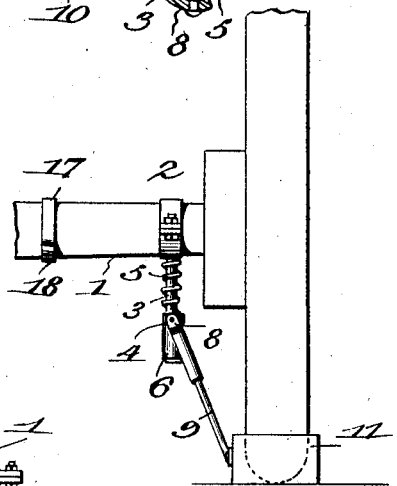
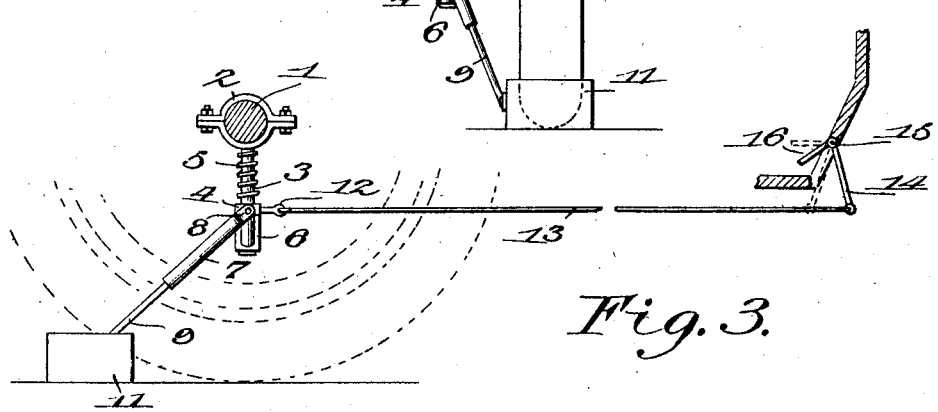
Joda Finch,
INVENTOR
BY Victor J. Evans
ATTORNEY
WITNESS:

UNITED STATES PATENT OFFICE.

JODA FINCH, OF GREAT NECK, NEW YORK.

AUTOMOBILE ATTACHMENT.

1,388,940. Specification of Letters Patent. Patented Aug. 30, 1921.

Application filed April 9, 1920. Serial No. 372,467.

*To all whom it may concern:*

Be it known that I, JODA FINCH, a citizen of the United States, residing at Great Neck, in the county of Nassau and State of New York, have invented new and useful Improvements in Automobile Attachments, of which the following is a specification.

This invention relates to an attachment for automobiles or other vehicles and has for its principal object the provision of means for blocking the wheel of the vehicle against retrograde movement when such vehicle is standing upon an inclined surface.

Another object is to provide such means with an operating device which may be operated from within the vehicle.

Other objects will appear from the following description and claim.

All of these objects are attained by mechanism shown in the accompanying drawing consisting of one sheet, in which:—

Figure 1 is a rear view of the rear axle of the vehicle provided with my attachment and showing such attachment in its normal position.

Fig. 2 is a similar view showing the attachment in operated condition.

Fig. 3 is a somewhat diagrammatic view showing my device and the connection whereby it is operated.

Fig. 4 is a fragmentary detail sectional view of the block carrying arm.

Like characters of reference refer to like parts in the several views.

In the drawings 1 represents the axle of an automobile or other vehicle, about which a band 2 is adapted to be secured in any desired manner. Depending from the band 2 is a bolt 3 upon which is loosely mounted a collar 4. A spring 5 tends constantly to force said collar down. 6 with the inclined portion 6ª represents an angular guide piece secured to the lower end of the bolt 3, the purpose of which will be later explained. An arm section 7 is provided with a bifurcation 8. The forks of which are pivoted to the sides of the collar 4. There is an arm section 9 which telescopes within the arm section 7 and is drawn into its position by spring 10. Mounted at the outer end of arm section 9 is a block 11 having one side formed to conform to the tire surface. Mounted on the collar 4 is a finger 12 to which is secured one end of a wire or cable 13, the other end of the cable being secured to a depending finger 14 which is pivotally mounted at 15 and adapted to be rocked by the depression of a foot pedal 16 as clearly shown in Fig. 3.

17 represents a spring member secured to the axle 1 and provided with outstanding lips 18 between which the arm 9 is normally grasped and supported.

The operation of the above device is as follows: When it is desired to throw the block 11 from the position shown in Fig. 1 to the operated position shown in Fig. 2, the operator by depressing foot pedal 16 moves the finger 14 counter-clock-wise thereby drawing the cable 13 forwardly. This carries finger 12 to move the collar 4 about its pivot and the arm section 7 which has been resting upon the high portion of the guide 6 now follows down the incline 6ª of said guide until the block is brought under the rear of the wheel of the vehicle. The block now stays stationary but the wheel and vehicle will move rearwardly an inch or so and the extensible arm 7—9 has been provided to take care of this independent movement. When the vehicle again starts forward, the block 11 may be returned by hand to the position shown in Fig. 1.

While I have described what I deem to be the most desirable embodiment of my invention, it is obvious that many of the details may be varied without in any way departing from the spirit of the invention; and I therefore do not wish to be considered as limiting myself to the exact details herein disclosed nor to anything less than the whole of my invention limited only by the appended claim.

Having described my invention what I claim as new and desire to secure by Letters Patent is:—

In a device of the character described, the combination of a rod adapted to be secured to the axle of a vehicle, a collar thereon, a spring for moving said collar in one direction, an extensible arm pivoted to said collar, a block supported by said arm, guiding means for said arm, means for holding said arm in normal position, and means for moving said arm from normal position.

In testimony whereof I have affixed my signature.

JODA FINCH.